United States Patent [19]
Kim

[11] Patent Number: 5,851,482
[45] Date of Patent: Dec. 22, 1998

[54] TIN-BISMUTH BASED LEAD-FREE SOLDER FOR COPPER AND COPPER ALLOYS

[75] Inventor: Chang-Joo Kim, Changwon-Si, Rep. of Korea

[73] Assignee: Korea Institute of Machinery & Metals, Daejeon-Si, Rep. of Korea

[21] Appl. No.: 770,797

[22] Filed: Dec. 20, 1996

[30] Foreign Application Priority Data

Mar. 22, 1996 [KR] Rep. of Korea .......... 96-8424
Mar. 24, 1996 [KR] Rep. of Korea .......... 96-8425
Mar. 24, 1996 [KR] Rep. of Korea .......... 96-8426

[51] Int. Cl.$^6$ .................................... C22C 13/00
[52] U.S. Cl. ............................. 420/557; 420/562
[58] Field of Search ...................... 420/557, 562

[56] References Cited

U.S. PATENT DOCUMENTS 3,607,253  9/1971  Cain et al. ............... 420/562

FOREIGN PATENT DOCUMENTS

| | | |
|---|---|---|
| 499452 | 8/1992 | European Pat. Off. . |
| 612578 | 8/1994 | European Pat. Off. . |
| 273454 | 11/1989 | German Dem. Rep. . |
| 58-031052 | 2/1983 | Japan . |
| 59-153857 | 9/1984 | Japan . |
| 03267333 | 11/1991 | Japan . |
| 08132279 | 5/1996 | Japan . |
| 2252564 | 8/1992 | United Kingdom . |
| 9534401 | 12/1995 | WIPO . |

*Primary Examiner*—Sikyin Ip
*Attorney, Agent, or Firm*—Armstrong, Westerman, Hattori, McLeland & Naughton

[57] ABSTRACT

Lead-free alloys for use as solders for copper and copper alloys. In the alloys, tin (Sn) and bismuth are the basic components and either one or both of antimony (Sb) and zinc (Zn) may be added as major elements to yield a low melting temperature alloy, and small quantities of one or more of aluminum (Al), magnesium (Mg) and tellurium (Te) may be added as elements capable of improving a soldering characteristics and properties of alloy. In preferred embodiments, the alloys contain bismuth (Bi) in a range of 1.0–20 wt %, and one or more of antimony (Sb) in the range of 0.1–8.0 wt %, more preferably 0.1–3.0 wt %, zinc (Zn) in a range of 0.01–3.0 wt %, aluminum (Al) in a range of 0.01–3.0 wt %, magnesium (Mg) in a range of 0.01–3.0 wt %, and tellurium (Te) in a range of 0.01–3.0 wt %, the balance being tin (Sn).

3 Claims, No Drawings

TIN-BISMUTH BASED LEAD-FREE SOLDER FOR COPPER AND COPPER ALLOYS

The present invention relates generally to a lead-free solder for copper and copper alloys, and, more particularly, to such a lead-free solder of an alloy based on tin (Sn) and bismuth (Bi) which may contain small quantities of antimony (Sb), zinc (Zn), aluminum (Al), magnesium (Mg), and/or tellurium (Te).

BACKGROUND OF THE INVENTION

A lead (Pb)-tin (Sn) solder containing 40–70 wt % lead is still widely used in soldering electric and electronic parts of copper and copper alloys. However, environmental pollution problems due to the lead component in such solder recently have been publicized. In particular, lead (Pb) is a heavy metal and once lead enters into a human body, the lead is accumulated and becomes injurious to human health. Consequently, it has become a well-known fact that lead is classified as a material which has to be restricted in its discharge during its use and must be kept from human contact as much as possible.

For example, in a workplace using a Pb—Sn solder, the lead component can fly into the air because soldering work is done by melting the solder to a high temperature of nearly 400° C. Accordingly, in order to prevent an environmental pollution problem due to the evolved lead, a dust collector or the like equipment is used to treat the air so as to remove lead. However, in some cases, such equipment is not perfect, and a large and continuous economic burden is imposed for equipping, operating and maintaining of such equipment.

OBJECT OF THE INVENTION

The present invention solves such problems as outlined above with respect to solders containing lead by providing a new soldering alloy which does not entirely contain a lead (Pb) so as to thereby prevent environmental pollution caused the heavy metal lead (Pb) component of conventional solders.

SUMMARY OF THE INVENTION

Briefly, the above object is achieved by a solder for copper and copper alloys in accordance with the present invention which consists essentially of 1.0–20 wt % bismuth (Bi), 0.0–8.0 wt % antimony (Sb), 0.0–3.0 wt % zinc (Zn), 0.0–3.0 wt % aluminum (Al), 0.0–3.0 wt % magnesium (Mg), 0.0–3.0 wt % tellurium (Te), and the balance tin (Sn).

DETAILED DESCRIPTION OF THE INVENTION

Preferred embodiments of the present invention are described in more detail in the following.

Tin (Sn) and bismuth (Bi) are the basic components of the solder alloys of the present invention. Either one or both of antimony (Sb) and zinc (Zn) may be added as major elements to yield a low melting temperature alloy, and small quantities of one or more of aluminum (Al), magnesium (Mg) and tellurium (Te) may be added as elements capable of improving soldering characteristics and other properties of the alloys.

With respect to the melting characteristics of the subject alloys, the melting point of tin (Sn) is 231° C. and the melting point of bismuth (Bi) is 271° C. When bismuth is added to tin, the melting point of the formed binary alloy gradually decreases with the increasing quantity of bismuth, and when the alloying ratio of bismuth becomes about 43 wt %, the alloy will show an eutectic alloy having a lowered melting point of about 139° C.

However, in a binary alloy of tin (Sn) and bismuth (Bi), when bismuth is contained in considerable quantities, the strength of the resultant alloy is improved but the ductility is decreased. In order to improve the soldering characteristics of such alloys such as, for instance, improvements in the brittleness, the viscosity of melt, the wettability, the rate of solidification and the brightness of the solder after solidification, bismuth (Bi) is added in a range of 1.0–20 wt %, and one or more of antimony (Sb) is added in the range of 0.1–8.0 wt %, preferably 0.1–3.0 wt %, zinc (Zn) is added in a range of 0.01–3.0 wt %, aluminum (Al) is added in a range of 0.01–3.0 wt %, magnesium (Mg) is added in a range of 0.01–3.0 wt %, and tellurium (Te) is added in a range of 0.01–3.0 wt %, the balance being tin (Sn).

As specific examples, the chemical composition of some kinds of solders according to the present invention are shown in the following Table 1-1, Table 1-2, Table 1-3 and Table 1-4. In addition, Table 2-1, Table 2-2, and Table 2-3 show the soldering temperature and the results with a dipping soldering for the solders set forth in Tables 1-1, 1-2 and 1-3. Tables 2-1, 2-2 and 2-3 illustrate that these solders have sufficient soldering characteristics for practical use.

TABLE 1-1

EXAMPLE 1 - SOLDERING ALLOY CHEMICAL COMPOSITION

| | wt % (Weight percent) | |
|---|---|---|
| Examples of Alloys | Sn | Bi |
| S—Bi0.50 | 90.50 | 0.50 |
| S—Bi1.00 | 90.00 | 1.00 |
| S—Bi3.00 | 89.50 | 3.00 |
| S—Bi5.00 | 89.00 | 5.00 |
| S—Bi10.00 | 88.00 | 10.00 |
| S—Bi30.00 | 86.00 | 30.00 |

TABLE 1-2

EXAMPLE 2 - SOLDERING ALLOY CHEMICAL COMPOSITION

| | wt % (Weight percent) | | |
|---|---|---|---|
| Examples of Alloys | Sn | Bi | Sb |
| S—Bi10—Sb1 | bal. | 10 | 1.0 |
| S—Bi10—Sb8 | bal. | 10 | 8.0 |
| S—Bi15—Sb.5 | bal. | 15 | 0.5 |
| S—Bi15—Sb1 | bal. | 15 | 1.0 |
| S—Bi15—Sb3 | bal. | 15 | 3.0 |

TABLE 1-3

EXAMPLE 3 - SOLDERING ALLOY CHEMICAL COMPOSITION

| | wt % (Weight percent) | | |
|---|---|---|---|
| Examples of Alloy | Sn | Bi | Al |
| Sn—Bi15—Al.5 | bal. | 15 | 0.5 |
| Sn—Bi15—Al1 | bal. | 15 | 1.0 |
| Sn—Bi15—Al2 | bai. | 15 | 2.0 |
| Sn—Bi15—Al3 | bal. | 15 | 3.0 |

TABLE 1-4

EXAMPLE 4 - SOLDERING ALLOY CHEMICAL COMPOSITION

|  | wt % (Weight percent) | | | |
| --- | --- | --- | --- | --- |
| Examples of Alloys | Sn | Bi | Sb | Al |
|  | wt % (Weight percent) | | | |
| Sn—Bi5—Sb.5—Al.5 | bal. | 5 | 0.5 | 0.5 |
| Sn—Bi5—Sb1—Al1 | bal. | 5 | 1.0 | 1.0 |
| Sn—Bi9—Sb8—Al1 | bal. | 9 | 8.0 | 1.0 |
| Sn—Bi10—Sb.5—Al1.5 | bal. | 10 | 0.5 | 0.5 |
| Sn—Bi10—Sb1—Al1 | bal. | 10 | 1.0 | 1.0 |
| Sn—Bi15—Sb.5—Al.5 | bal. | 15 | 1.0 | 1.0 |
| Sn—Bi15—Sb1—Al1 | bal | 15 | 1.0 | 1.0 |
| Sn—Bi20—Sb.5—Al.5 | bal. | 20 | 0.5 | 0.5 |
| Sn—Bi20—Sb1—Al1 | bal. | 20 | 1.0 | 1.0 |

TABLE 2-1

EXAMPLE 1 - SOLDERING TEST RESULT

| Examples of alloys | Temperature | Dipping Time | Wettability | Viscosity | Brightness | Soldering State |
| --- | --- | --- | --- | --- | --- | --- |
| Sn—Bi0.50 | 360° C. | w/in 1 sec. | good | good | ordinary | good |
| Sn—Bi1.00 | 360° C. | w/in 1 sec. | good | good | good | good |
| Sn—Bi3.00 | 360° C. | w/in 1 sec. | good | good | good | good |
| Sn—Bi5.00 | 360° C. | w/in 1 sec. | good | good | good | good |
| Sn—Bi10.00 | 360° C. | w/in 1 sec. | good | good | ordinary | good |
| Sn—Bi30.00 | 355° C. | w/in 1 sec. | good | good | ordinary | good |

TABLE 2-2

EXAMPLE 2 - SOLDERING TEST RESULT

| Examples of alloys | Temperature | Dipping Time | Wettability | Viscosity | Brightness | Soldering State |
| --- | --- | --- | --- | --- | --- | --- |
| Sn—Bi10—Sb1 | 400° C. | w/in 1 sec. | ordinary | good | ordinary | ordinary |
| Sn—Bi10—Sb8 | 400° C. | w/in 1 sec. | ordinary | good | ordinary | ordinary |
| Sn—Bi15—Sb.5 | 385° C. | w/in 1 sec. | good | good | ordinary | good |
| Sn—Bi15—Sb1 | 380° C. | w/in 1 sec. | good | good | ordinary | good |
| Sn—Bi15—Sb3 | 365° C. | w/in 1 sec. | good | good | ordinary | good |

TABLE 3

EXAMPLE 3 - SOLDERING TEST RESULT

| Examples of alloys | Temperature | Dipping Time | Wettability | Viscosity | Brightness | Soldering State |
| --- | --- | --- | --- | --- | --- | --- |
| Sn—Bi15—Al.5 | 370° C. | w/in 1 sec. | ordinary | good | ordinary | good |
| Sn—Bi10—Al1 | 370° C. | w/in 1 sec. | ordinary | good | ordinary | good |
| Sn—Bi15—Al2 | 400° C. | w/in 1 sec. | good | ordinary | ordinary | ordinary |
| Sn—Bi15—Al3 | 400° C. | w/in 1 sec. | bad | ordinary | ordinary | good |

TABLE 2-4

EXAMPLE 3 OF SOLDERING TEST RESULT

| Examples of alloys | Temperature | Dipping Time | Wettability | Viscosity | Brightness | Soldering State |
|---|---|---|---|---|---|---|
| Sn—Bi—Sb.5—Al.5 | 400° C. | w/in 1 sec. | ordinary | ordinary | good | ordinary |
| Sn—Bi5—S1—Al1 | 400° C. | w/in 1 sec. | ordinary | ordinary | good | ordinary |
| Sn—Bi9—Sb8—Al1 | 400° C. | w/in 1 sec. | ordinary | ordinary | ordinary | ordinary |
| Sn—Bi10—Sb.5—Al1 | 400° C. | w/in 1 sec. | ordinary | ordinary | ordinary | ordinary |
| Sn—Bi10—Sb1—Al1 | 400° C. | w/in 1 sec. | ordinary | ordinary | ordinary | ordinary |
| Sn—Bi15—Sb.5—Al.5 | 400° C. | w/in 1 sec. | ordinary | ordinary | ordinary | ordinary |
| Sn—Bi15—Sb.5—Al.5 | 400° C. | w/in 1 sec. | ordinary | ordinary | ordinary | ordinary |
| Sn—Bi20—Sb5—Al1.5 | 400° C. | w/in 1 sec. | ordinary | ordinary | ordinary | ordinary |

While there has been described what are considered to be preferred embodiments of the alloys of the present invention, it will be apparent to those skilled in the art that various changes and modifications may be made therein without departing from the invention as defined in the appended claims.

What is claimed is:

1. A lead-free solder for copper and copper alloys, the solder of an alloy consisting essentially of 5–15 wt % bismuth (Bi), 0.01–3.0 wt % antimony (Sb), 0.01–3.0 wt % zinc (Zn), 0.01–3.0 wt % aluminum (Al), 0.01–3.0 wt % magnesium (Mg), 0.01–3.0 wt % tellurium (Te), and the balance tin (Sn).

2. A lead-free solder according to claim 1, wherein the solder contains 0.1–3.0 wt % antimony (Sb).

3. A lead-free solder according to claim 1, wherein the solder contains 0.1–3.0 wt % aluminum (Al).

* * * * *